United States Patent Office 2,930,759
Patented Mar. 29, 1960

2,930,759

PENETRATING OIL

Rhea N. Watts, St. Francisville, La., assignor to Esso Research and Engineering Company, a corporation of Delaware No Drawing. Application January 19, 1956
Serial No. 560,068

7 Claims. (Cl. 252—57)

This invention relates to lubricating compositions having a high degree of capillarity and low surface tension which are extremely useful as penetrating oils. Particularly, this invention relates to lubricating oil compositions which are highly effective in penetrating closely bound surfaces, in loosening or dissolving rust, and which will also dissolve grease, tars and gum deposits. More particularly, this invention relates to penetrating oil compositions composed of an alcohol and the so-called "C₈ Oxo Bottoms," which are the residue from a distillation of alcohols formed by the well known Oxo process.

It has been known to the art that oxygenated organic compounds may be made by reacting together carbon monoxide, hydrogen and a monoolefinic hydrocarbon to form an intermediate product which may be subsequently reduced to an alcohol having one carbon atom more than the starting hydrocarbon. This reaction is carried out in the presence of a cobalt-containing catalyst, or an equivalent catlayst, in a two-stage operation, the product formed in the first stage being predominantly aldehydic with a minor portion of alcohols. In the second stage, the product of the first stage is hydrogenated, or reduced, to the corresponding alcohol containing an additional carbon atom.

These reactions may be simply represented for a monoolefinic feed as follows, it being understood that other reactions may take place to a minor extent.

First stage:

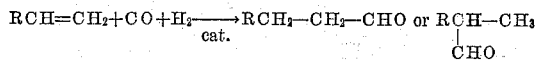

Second stage:

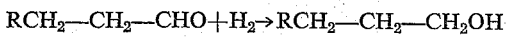

or

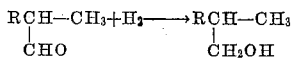

It is evident from the above equations that a primary alcohol containing one more carbon atom than the starting monoolefin will result and that the position in the molecule of the added group will depend on the position of the double bond in the original olefin, or the position to which the double bond may shift by isomerization under the reaction conditions used.

The olefin feed for the above reactions may be any olefin known to the art. Such olefins as ethylene, propylene, butylenes, pentenes, hexenes, olefin polymers, such as diisobutylene, triisobutylene, polypropylenes, and olefinic fractions from the hydrocarbon synthesis process, thermal or catalytic cracking operations, and from other sources may be used as starting materials.

Of particular interest are the polymers and copolymers of C₃ and C₄ monoolefins. These monoolefins are readily available in petroleum refinery streams, and processes for their conversion to liquid copolymers have been described by the art. One such process consists of passing the olefin-containing stream in liquid phase in contact with an acid catlayst comprising phosphoric acid impregnated on kieselguhr. Other acidic catalysts, such as phosphoric acid or copper phosphate impregnated on silica gel, sulfuric acid, Friedel-Crafts catalysts, activated clays, silica-alumina, copper pyrophosphate, etc., may be used. Suitable conditions when employing catalyst of the phosphoric acid type are temperatures of 300° F. to 500° F., pressures of from 250 to 5,000 p.s.i. and feed stocks comprising refinery streams containing propylene and mixed butylenes. Suitable feed stocks, for example, may contain from 15 to 60 mol percent propylene, from 0.5 to 15 mol percent butylenes, and from 0.1 to 10 mol percent isobutylene, the remaining being saturated hydrocarbons. Other suitable feed stocks are the dimer and trimer of isobutylene.

The carbon monoxide and hydrogen may be manufactured by conventional methods from any materials, such as coke, coal, lignite, or hydrocarbon gases, such as natural gas or methane. The solid materials may be converted by known methods into carbon monoxide and hydrogen by treatment with stream and/or carbon dioxide. The ratio of carbon monoxide to hydrogen may be varied by varying the amount of steam used to react with the solid material so that a part of the carbon monoxide may react with the steam to form carbon dioxide and hydrogen, thus increasing the molar ratio of hydrogen to carbon monoxide. The carbon dioxide may be removed by scrubbing the gaseous mixture with aqueous ethanolamine or other basic substance. The hydrocarbon gases may be converted to hydrogen and carbon monoxide in a number of ways, such as treatment with oxygen, carbon dioxide, or steam, or a combination of steam and carbon dioxide, catalytically, in accordance with known procedures.

In the first stage of the reaction, or the aldehyde synthesis stage, hereinafter referred to as the "Oxo stage," the ratio of hydrogen to carbon monoxide employed may vary appreciably. Ratios of 0.5 volume to 10.0 volumes of hydrogen per volume of carbon monoxide may be employed. The preferred ratios comprise about 1.0 volume of hydrogen per volume of carbon monoxide. The quantities of olefins employed per volume of carbon monoxide and hydrogen likewise may vary considerably, as may the composition of the olefin feed stream. The olefin feed, as mentioned above, may comprise pure olefins or may comprise olefins containing paraffinic and other hydrocarbons. In general, it is preferred that the olefin feed stock comprise olefins having from 2 to 18 carbon atoms per molecule, particularly desirable olefins comprise those having from about 6 to about 18 carbon atoms per molecule.

The Oxo stage is generally carried out at elevated pressures ranging from about 30 to 400 atmospheres and at an elevated temperature in the range of about 200° F. to about 400° F. The quantity of hydrogen plus carbon monoxide with respect to olefin utilized may vary considerably, as for example, from 1000 to 45,000 standard condition cubic feet of carbon monoxide and hydrogen per barrel of liquid olefin feed. In general, however, approximately 2500 to 15,000 cubic feet of carbon monoxidehydrogen gas per barrel of olefin feed is used.

Following the Oxo stage, the aldehyde product, containing considerable amounts of dissolved catalyst is generally decobalted; i.e., treated at elevated temperatures in the presence of a gas, vapor, or liquid, to decompose the cobalt catalyst and to free the aldehyde of dissolved metal.

In the second, or hydrogenation stage, any catalyst such as nickel, copper, tungsten sulfide, nickel sulfide, or sulfides of groups VI and VIII metals of the periodic table or mixtures of them may be used. The hydrogenation temperatures are generally in the range of from about 150° to 750° F., while the pressures generally employed are in the range of about 100 to 300 atmospheres.

Alcohols from the second stage of the reaction are used as intermediates for the preparation of plasticizers and detergents. Alcohols prepared by the Oxo reaction and having from eight to sixteen carbon atoms find maximum usefulness for these purposes.

One of the serious problems that has been encountered in the carbonylation or oxonation reaction, as the first stage is frequently designated, has been the formation of secondary reaction products. The carbonylation reaction is highly exothermic, with a heat release of the same high order of magnitude as in the hydrocarbon synthesis reaction, about 35 to 50 Kcal./gram mole olefinic double bond reacted. For this and other reasons, secondary reaction products tend to form and careful temperature control is necessary in the carbonylation reaction zone to minimize this secondary reaction product formation. For instance, the decomposition of the carbonylation catalyst to metallic cobalt reaches an appreciable rate above 350° F. The presence of cobalt metal catalyzes such secondary reactions as polymerization of aldehydes, aldol condensations as well as hydrogenation of the aldehydes to alcohols which further react to yield acetals and hemiacetals with the aldehydes present. Esters may also be produced by a Cannizzaro type reaction.

In the hydrogenation stage, in the presence of the hydrogenation catalysts and under the conditions employed, further condensations and reactions of the initially formed aldehydes and alcohols take place to give additional high-boiling impurities which are generally allowed to remain as the "bottoms" after the distillation of the main portion of the alcohol is completed.

In a process for the manufacture of iso-octyl alcohol by a two-stage Oxo process using $C_7$ olefinic feed, the final distillation of the crude $C_8$ alcohol product results in a bottom fraction which boils above 400° F. representing about 15% to 30% of the crude alcohol charge to the distillation zone. This bottoms fraction consists of $C_8$ and $C_9$ alcohols, as well as $C_{15}$–$C_{16}$ alcohols, $C_{24}$ acetals, and $C_{16}$ ethers. Of these constituents, the $C_8$ alcohols represent the final traces (1–20%) remaining in the bottoms from the distillation of the main product. The $C_9$ alcohols representing 5% to 30% of the bottoms are generally degraded to bottoms since the presence of this higher alcohol in the $C_8$ alcohol product has an adverse effect on the use of the $C_8$ alcohol for manufacture of plasticizers, such as dioctyl phthalates. Poorer colors and more brittle plasticizers result from the inclusion of even small amounts of $C_9$ alcohols in the $C_8$ alcohol product. The remaining 70% of the so-called bottoms consists primarily of higher-boiling oxygenated compounds formed by side reactions as outlined above as occurring in either the first or second stage of the $C_8$ Oxo alcohol process. As clearly as can be determined by chemical analysis and infra-red absorption spectrographic study, these constituents were identified as $C_{15}$ secondary alcohols, $C_{15}$ aldehydes or ketones, $C_{24}$ acetals, esters of naphthenic, oleic, or other acids used in making the cobalt catalyst for the first or oxonation stage, and saturated and unsaturated $C_{16}$ ethers. A typical chemical analysis of the higher-boiling oxygenated compounds obtained in a plant, and free from $C_8$–$C_9$ alcohols fraction, is shown in Table I. The hydroxyl number, free and combined carbonyl numbers, and saponification and acid numbers are expressed in terms of milligrams of potassium hydroxide per gram of sample analyzed.

TABLE I

*Typical composition of the Oxo alcohol bottoms*

Chemical analysis:
  Hydroxyl number _____ 95
  Free carbonyl number _____ 0.5
  Combined carbonyl number _____ 29
  Saponification number _____ 21
  Acid number _____ 0.2

Constituents, percent by weight:
  48.6% $C_{15}$–$C_{16}$ alcohol
  0.2% $C_{15}$–$C_{16}$ aldehyde or ketone
  19.1% $C_{24}$ acetal
  14.7% $C_{22}$ (octyl naphthenate) ester
  17.4% saturated $C_{16}$ ether (dioctyl ether)[1]

[1] Calculated by difference.

Analytical results obtained by chemical and infra-red methods appear to be in essentially good agreement as indicated by their comparison in Table II below:

TABLE II

*Comparison of analyses of Oxo alcohol bottoms*

|  | Chemical Method | Infra-Red Method |
|---|---|---|
| Percent $C_{15}$–$C_{16}$ alcohols | 48.6 | 43 |
| Percent $C_{15}$–$C_{16}$ ketones | 0.2 | 4 |
| Percent $C_{22}$ ester | 14.7 | 13 |
| Percent $C_{24}$ acetal | 19.1 | 9 |
| Percent acid | Trace |  |
| Percent saturated $C_{16}$ ether | 17.4 | 27 |
| Percent unsaturated $C_{16}$ ether |  | 3 |

Certain cuts were selected on the basis of the distillation curve of the bottoms and these cuts were used to obtain infra-red spectra on the Baird instrument. By this method, it was determined that the various compound types occurred in these fractions in the percentage ranges shown in Table III.

TABLE III

*Compound types found in Oxo bottoms fractions*

| Compound type | Percentage Range of Distillate in Which Present |
|---|---|
| $C_8$ alcohol | 0–15. |
| $C_9$ alcohol | 10–35. |
| $C_{16}$ saturated ether | 20–60 (concentrated at about 40%). |
| Higher alcohol ($C_{15}$–$C_{16}$) | 40–76 (concentrated at around 60% but mixed with appreciable ether). |
| Organic carbonyl compounds | Evident in all cuts examined from 35–76%. Esters appear to be more evident in higher boiling range. Lower boiling ranges are suggestive of ketones. |
| Unsaturation | Evident in small amounts in all cuts examined from 35–76%. |
| Acetal | Small amount may be present 74–76% cut. |

Thus it can readily be seen that the synthetic Oxo processes give complex mixtures of compounds having various carbon structures in the molecules and having varied molecular weights. Separation and isolation of the high-boiling non-alcoholic impurities occurring in the Oxo bottoms are particularly difficult. Sometimes it is possible to separate many of these mixtures into specific components and narrow fractions by distillation, solvent extraction, and the like, but separations from the standpoint of obtaining substantially pure homogeneous fractions of relatively pure compounds in an economic process is impossible using the present known methods. In some cases, these difficulty separable mixtures are simply sent to slop or used in relatively cheap fuels. Thus, utilization of these higher-boiling impurities which are formed in substantial amounts becomes a very important factor in governing the extent of application of the Oxo process, as well as being a powerful economic factor.

This invention is mainly concerned with the utilization of the above described $C_8$ Oxo bottoms. These $C_8$ Oxo bottoms have lubricating and penetrating properties and may be utilized as penetrating oils. However, their penetrating or capillary properties are much improved by the incorporation of a suitable alcohol.

Operable alcohols include those straight chain and branched chain monohydric alcohols containing from 1 to 6 carbon atoms which may be either primary, secondary or tertiary alcohols. Specifically, some of such operable alcohols include methyl alcohol, ethyl alcohol, n- propyl alcohol, isopropyl alcohol, allyl alcohol, n-butyl alcohol, isobutyl alcohol, secondary butyl alcohol, 2-ethyl-n-butyl alcohol, tertiary butyl alcohol, n-amyl alcohol, isoamyl alcohol, tertiary amyl alcohol, and diacetone alcohol. It is preferred to mix the alcohols of the invention with the $C_8$ Oxo bottoms in amounts of about .5 to 4 volumes of alcohol per volume of the $C_8$ Oxo bottom. More preferably the alcohol is used in amounts of about 1 to 3 volumes of alcohol per volume of the $C_8$ Oxo bottoms.

Table IV sets up the physical properties of the preferred $C_8$ Oxo bottoms of the invention and of a preferred penetrating oil composed of 1 volume of $C_8$ Oxo bottoms and 2 volumes of isopropyl alcohol. Table IV also compares the corresponding properties of two commercial penetrating oils.

As can be seen from the above table, the penetrating oil of the invention composed of the $C_8$ Oxo bottoms and isopropyl alcohol has a high solvency power as indicated by the kauri-butanol value, a very low surface tension and a low viscosity at 100° F. The kauri-butanol test, which is a measure of the solvency power of hydrocarbon materials, would indicate that the preferred penetrating oil of the invention will be exceptionally suitable to cut through tar, gum and grease deposits. This is a desirable property since frequently the rusted parts to be losened may be also coated with various greases, tars, etc. The low surface tension indicates that the preferred penetrating oil of the invention has excellent spreading or creeping properties. The low viscosity at 100° F. indicates that the oil is sufficiently thin at normal temperatures to flow or penetrate very readily.

It is well known in the art that there is a direct relationship between the capillarity of a penetrating oil and its effectiveness. In order to further demonstrate the operability of the penetrating oils of the invention a simple comparative test was made to determine the relative capillarity of the various penetrating oils of the invention as compared to commercial type penetrating oils.

A 100 ml. beaker was partly filled with 50 ml. of the penetrating oil being tested, consisting of one volume of $C_8$ Oxo bottoms and two volumes of isopropyl alcohol. An 8 inch length of rusty steel rod having a diameter of ¾ inch was suspended above the breaker so that its lower end dipped 1 inch below the surface of the penetrating oil mixture. The penetrating oil then began to creep up the steel rod. The height of climb of the penetrating oil was measured periodically in terms of sixteens of an inch, until such creeping action creased. The amount of climb and the final height obtained by the sample are set out in Table V.

A number of different blends were also subjected to the above test using similar rods with the same degree of rusting. Comparison tests were also made of two commercial penetrating oils. The results of these tests are set out in Table V.

TABLE IV

*Properties of penetrating oils*

| Sample | Commercial Penetrating Oil A [1] | Commercial Penetrating Oil B [2] | $C_8$ Oxo Bottoms + 2 Volumes Isopropyl Alcohol | $C_8$ Oxo Bottoms Only |
|---|---|---|---|---|
| Engler dist., ° F.: | | | | |
| Initial | 175 | 238 | 178 | 406 |
| 5% | 194 | 318 | 179 | 450 |
| 10% | 198 | 340 | 179 | 475 |
| 20% | 204 | 361 | 180 | 508 |
| 30% | 210 | 383 | 181 | 535 |
| 40% | 220 | 407 | 183 | 556 |
| 50% | 231 | 440 | 185 | 579 |
| 60% | 256 | 518 | 197 | 600 |
| 70% | 302 | 644 | 470 | 629 |
| 80% | 627 | 680 | 568 | 658 |
| 90% | 684 | | 622 | 689 |
| 95% | | | 657 | 700 |
| Final | 700 | 700 | 660 | 700 |
| Recovery | 92.5 | 87.5 | 99.0 | 95.0 |
| Residue | 7.5 | 12.5 | 1.0 | 5.0 |
| Flash, ° F | 12 | 112 | 58 | 220 |
| Kauri-butanol value | 85 | 61 | 300+ | 129 |
| Surface tension, dynes/cc | 42.4 | 41.2 | 35.0 | 39.4 |
| Vis. @ 100° F | 0.889 | 2.738 | 2.786 | 10.003 |

[1] Analysis indicated a composition of about 70 wt. percent coal tar distillate (crude benzene), about 22.5 wt. percent paraffinic distillate and about 7.5 wt. percent graphite.
[2] Analysis indicated a composition of about 30 wt. percent kerosene, about 20 wt. percent of a pine oil, and about 50 wt. percent of a paraffin distillate.

TABLE V

*Relative capillarity* [1]

| Ex. No. | Sections | 30 Sec. | 1 Min. | 2 Min. | 5 Min. | 15 Min. | 1 Hr. | 3 Hr. | 1 Day | Final |
|---|---|---|---|---|---|---|---|---|---|---|
| | SECTION A | | | | | | | | | |
| 1 | Penetrating oil "A" | 5 | 9 | 9 | 11 | 13 | 15 | 22 | 45 | 67 |
| 2 | Penetrating oil "B" | 5 | 7 | 9 | 11 | 17 | 25 | 33 | 58 | 84 |
| | SECTION B | | | | | | | | | |
| 3 | $C_8$ oxo bottoms | 4 | 4 | 5 | 11 | 15 | 22 | 29 | 58 | 76 |
| 4 | Isopropyl alcohol | 5 | 7 | 7 | 7 | 8 | 8 | 8 | 8 | 8 |
| 5 | 1 vol. $C_8$ oxo bottoms plus 1 vol. isopropyl alcohol | 7 | 9 | 10 | 12 | 17 | 27 | 36 | 77 | 99 |
| 6 | 1 vol. $C_8$ oxo bottoms plus 2 vol. isopropyl alcohol | 7 | 8 | 9 | 12 | 20 | 27 | 39 | 86 | 116 |
| 7 | 1 vol. $C_8$ oxo bottoms plus 3 vol. isopropyl alcohol | 6 | 7 | 9 | 12 | 18 | 22 | 31 | 70 | 93 |
| | SECTION C | | | | | | | | | |
| 8 | Methanol | 8 | 11 | 13 | 14 | 16 | 17 | 18 | 15 | 15 |
| 9 | 1 vol. $C_8$ oxo bottoms plus 1 vol. methanol | 6 | 7 | 9 | 11 | 15 | 22 | 34 | 68 | 90 |
| | SECTION D | | | | | | | | | |
| 10 | 1 vol. $C_8$ oxo bottoms plus 1 vol. n-amyl alcohol | 5 | 7 | 8 | 10 | 15 | 24 | 33 | 67 | 99 |
| 11 | 1 vol. $C_8$ oxo bottoms plus 1 vol. diacetone alcohol | 6 | 7 | 8 | 9 | 12 | 18 | 26 | 53 | 90 |
| 12 | 1 vol. $C_8$ oxo bottoms plus 1 vol. iso amyl alcohol | 5 | 7 | 9 | 11 | 18 | 27 | 41 | 71 | 99 |
| 13 | 1 vol. $C_8$ oxo bottoms plus 1 vol. tertiary amyl alcohol | 5 | 7 | 8 | 10 | 16 | 25 | 33 | 57 | 77 |
| 14 | 1 vol. $C_8$ oxo bottoms plus 1 vol. n-butanol | 5 | 7 | 9 | 11 | 15 | 24 | 33 | 69 | 85 |
| 15 | 1 vol. $C_8$ oxo bottoms plus 1 vol. tertiary butyl alcohol | 5 | 7 | 8 | 10 | 15 | 24 | 35 | 67 | 82 |
| 16 | 1 vol. $C_8$ oxo bottoms plus 1 vol. 2-ethyl-n-butyl alcohol | 5 | 5 | 6 | 9 | 12 | 17 | 19 | 64 | 86 |
| | SECTION E | | | | | | | | | |
| 17 | 1 vol. $C_8$ oxo bottoms plus 1 vol. benzene | 4 | 6 | 7 | 9 | 15 | 24 | 35 | 65 | 89 |
| 18 | 1 vol. $C_8$ oxo bottoms plus 1 vol. carbon tetrachloride | 4 | 5 | 6 | 8 | 12 | 19 | 28 | 57 | 73 |
| | SECTION F | | | | | | | | | |
| 19 | 1 vol. $C_{10}$ oxo bottoms plus 2 vol. isopropyl alcohol | 5 | 7 | 8 | 9 | 13 | 21 | 28 | 59 | 88 |
| 20 | 1 vol. $C_{13}$ oxo bottoms plus 2 vol. isopropyl alcohol | 6 | 7 | 7 | 9 | 12 | 18 | 27 | 51 | 65 |
| 21 | 1 vol. $C_{10}$ oxo bottoms plus 2 vol. n-butanol | 5 | 6 | 9 | 9 | 11 | 17 | | 23 | 68 |
| 22 | 1 vol. $C_{13}$ oxo bottoms plus 2 vol. n-butanol | 4 | 5 | 6 | 7 | 9 | 13 | | 18 | 42 |

[1] Measured in sixteenths of an inch.

The above table compares the capillarity of various compositions from a time period of as low as 30 seconds to a day or even longer. The importance or significance of these various time periods will be seen when considering the manner of using the penetrating oil. For example, if the parts to be loosened are readily accessible to the point of application of the penetrating oil only a short time will be required for the oil to penetrate to the parts. An oil having a relatively high initial degree of capillarity would then be most desirable. On the other hand, if the parts to be loosened are at a considerable distance from the point of application of the penetrating oil, the composition exhibiting a high degree of capillarity over a longer time period will be most desirable. The best all-around penetrating oil compositions will be that exhibiting both a high initial degree of capillarity and also a high total or final degree of capillarity.

Considering in detail the results shown on the above table:

Section A shows the relative capillarity of the two commercial penetrating oils previously mentioned.

Section B illustrates the excellent results obtained using a composition of isopropyl alcohol and the $C_8$ Oxo bottoms. Examples 3 and 4 show the capillarity of $C_8$ Oxo bottoms and isopropyl alcohol, respectively. It is to be noted that both of these examples have a low degree of capillarity. However, blends of the $C_8$ Oxo bottoms and the isopropyl alcohol (Examples 5, 6 and 7) exhibited exceptional results, totally unexpected from the capillarity data of either of the two components alone. While Examples 5, 6 and 7 all gave results far superior to those obtained with any of the other compositions tested including the two commercial penetrating oils, Example 6 was especially good and for this reason is preferred.

Section C of the table demonstrates the effectiveness of methanol and $C_8$ Oxo bottoms.

Section D discloses a broad range of other alcohols which were also operable.

Section E covers the use of benzene and carbon tetrachloride. In general, the use of these two solvents gave lower initial rates of capillarity than the compositions using alcohol. In fact, the use of carbon tetrachloride effected little improvement, if any, in the capillarity of the straight $C_8$ Oxo bottom material shown in Example 3. However, the use of low boiling aromatics and chlorinated solvents such as benzene and carbon tetrachloride is not recommended for this application because of their toxic properties.

Section F covers various blends of $C_{10}$ and $C_{13}$ Oxo bottoms with isopropyl alcohol and n-butanol. The $C_{10}$ and $C_{13}$ Oxo bottoms were not as effective as the $C_8$ Oxo bottoms.

The use of an alcohol also insures that the resulting penetrating oil will be able to absorb any moisture or water that might be present on the parts to be loosened. This property insures that the oil will penetrate through any water film directly to the rusted metal surface.

In summary, the synthetic oil known as $C_8$ Oxo bottoms has desirable lubricating and penetrating properties and forms an excellent base material for the manufacture of a penetrating oil. It has been found that the combination of $C_8$ Oxo bottoms with alcohols having from 1 to 6 carbon atoms will form an excellent penetrating oil which will absorb moisture, which has a high degree of capillarity, a low surface tension, and which will not have a disagreeable odor or present a health hazard.

What is claimed is:

1. An improved lubricating oil of high spreading and penetrating ability consisting essentially of one volume of a synthetic lubricating oil boiling above 400° F., which is obtained as a bottoms fraction in the distillation of a crude $C_8$ Oxo alcohol, and about 0.5 to 4 volumes of a monohydric alcohol having in the range of 1 to 6 carbon atoms per molecule, wherein said $C_8$ Oxo alcohol is formed by subjecting a $C_7$ olefin to the action of carbon monoxide and hydrogen in the presence of a cobalt catalyst at a temperature of about 200° to 400° F. and under a pressure of about 30 to 400 atmospheres to form an aldehyde which is hydrogenated to form said alcohol.

2. A composition according to claim 1 wherein said alcohol is methyl alcohol.

3. A composition according to claim 1 wherein said alcohol is amyl alcohol.

4. A composition according to claim 1 wherein said alcohol is butyl alcohol.

5. A composition according to claim 1 wherein said alcohol is 2-ethyl-n-butyl alcohol.

6. A composition according to claim 1 wherein said alcohol is diacetone alcohol.

7. An improved lubricating oil of high spreading and penetrating ability consisting essentially of 1 volume of a synthetic lubricating oil boiling above 400° F., which is obtained as a bottoms fraction in the distillation of a crude $C_8$ Oxo alcohol, and about 0.5 to 4 volumes of isopropyl alcohol, wherein said $C_8$ Oxo alcohol is formed by subjecting a $C_7$ olefin to the action of carbon monoxide and hydrogen in the presence of a cobalt catalyst at a temperature of about 200° to 400° F. and under a pressure of about 30 to 400 atmospheres to form an aldehyde which is hydrogenated to form said alcohol.

References Cited in the file of this patent

UNITED STATES PATENTS

| | | |
|---|---|---|
| 2,446,944 | Morgan | Aug. 10, 1948 |
| 2,610,948 | Morway | Sept. 16, 1952 |

OTHER REFERENCES

Industrial Solvents, Mellan, 2nd ed. (1950), p. 471.